United States Patent
Prushinskiy et al.

(10) Patent No.: US 9,261,725 B2
(45) Date of Patent: Feb. 16, 2016

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Valeriy Prushinskiy, Hwaseong-si (KR); Tae Wook Kang, Seongnam-si (KR); Min Soo Kim, Seoul (KR); Len Kaplan, Hwaseong-si (KR); Nak Cho Choi, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/174,398

(22) Filed: Feb. 6, 2014

(65) Prior Publication Data

US 2015/0070631 A1    Mar. 12, 2015

(30) Foreign Application Priority Data

Sep. 11, 2013    (KR) .......................... 10-2013-0109368

(51) Int. Cl.
*G02F 1/1333*    (2006.01)
*G02F 1/1341*    (2006.01)
*G02F 1/1339*    (2006.01)

(52) U.S. Cl.
CPC ........ *G02F 1/133377* (2013.01); *G02F 1/1339* (2013.01); *G02F 1/1341* (2013.01); *G02F 2001/133368* (2013.01)

(58) Field of Classification Search
CPC ............ G02F 1/133377; G02F 1/1339; G02F 1/1341; G02F 2001/133368
See application file for complete search history.

(56) References Cited

U.S. PATENT DOCUMENTS

| | | | |
|---|---|---|---|
| 7,123,319 | B2 | 10/2006 | Broer et al. |
| 8,169,140 | B2 | 5/2012 | Han |
| 2006/0051533 | A1 | 3/2006 | Song et al. |
| 2009/0046231 | A1 | 2/2009 | Lu et al. |
| 2012/0062448 | A1 | 3/2012 | Kim et al. |
| 2013/0021572 | A1 | 1/2013 | Urayama et al. |
| 2013/0026478 | A1* | 1/2013 | Noda et al. ...................... 257/59 |
| 2013/0093985 | A1 | 4/2013 | Kang et al. |

FOREIGN PATENT DOCUMENTS

| | | |
|---|---|---|
| JP | 2000-330130 | 11/2000 |
| KR | 10-2001-0005935 A | 1/2001 |
| KR | 10-2003-0063656 A | 7/2003 |
| KR | 10-2012-0134147 | 12/2012 |

* cited by examiner

*Primary Examiner* — Dennis Y Kim
(74) *Attorney, Agent, or Firm* — Innovation Counsel LLP

(57) ABSTRACT

A liquid crystal display has liquid crystal containerizing micro-cavities monolithically integrally formed as part of a thin film transistors substrate thereof where mouths of the micro-cavities are sealed shut by material of a capping layer and where the capping layer is patterned to have relatively thicker regions and comparatively thinner or devoid of capping material regions interposed between the thicker regions for thereby providing the capping layer with improved flexibility, the relatively thicker regions being disposed over the mouths of the microcavities.

18 Claims, 16 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2013-0109368 filed in the Korean Intellectual Property Office on Sep. 11, 2013, the entire contents of which application are incorporated herein by reference.

BACKGROUND (a) Field

The present disclosure of invention relates to a liquid crystal display and a manufacturing method thereof.

(b) Description of Related Technology

The liquid crystal display (LCD) is one of the more widely used of the flat or otherwise thin panel displays. A typical LCD includes two spaced apart panels provided with field-generating electrodes such pixel electrodes and a common electrode, and a liquid crystal (LC) material layer interposed therebetween.

The LCD produces images by applying voltages to the field-generating electrodes to generate an electric field passing through the LC layer, which then determines orientations of LC molecules in the LC layer and thereby adjusts polarization of incident light. The adjusted polarization is used to control degree of luminance of passed through and/or reflected light rays.

A relatively new technology for containerizing the LC material includes forming a micro-cavity that is integrally provided as part of the cell unit of a corresponding pixel and filling the cavity with liquid crystal fluid. This technology typically includes the manufacturing steps of forming a sacrificial layer composed of an organic material and the like, forming a supporting member (roof member) on the sacrificial layer, removing the sacrificial layer to leave a space under stood the roof member, and filling the empty space formed through the removal of the sacrificial layer with liquid crystal through a liquid crystal injection hole. This monolithically integrated process has various advantages over the more traditional method of gluing an upper panel non-monolithically to a lower panel.

Here, after injecting the liquid crystal, the liquid crystal injection hole may be capped (sealed closed) with a coating material and the like. However, that leaves the capping material in direct contact with the liquid crystal fluid at the mouth of the microcavity, such that there is a danger of contamination of the liquid crystal by the capping material or impurities disposed thereon.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a liquid crystal display structured for reducing contamination of a liquid crystal (LC) thereof by capping mouths of corresponding LC-containerizing micro-cavities with a patterned capping layer, and a manufacturing method thereof.

An exemplary embodiment provides a liquid crystal display including: a substrate; a thin film transistor disposed on the substrate; a pixel electrode connected to a terminal of the thin film transistor; a lower insulating layer disposed to face the pixel electrode; a roof layer disposed on the lower insulating layer; and a capping layer disposed on the roof layer, wherein a plurality of microcavities each having a respective liquid crystal injection holes are each being formed between the pixel electrode and the roof layer, the microcavities including liquid crystal materials, the capping layer being patterned to include a first region and a second region, where the liquid crystal injection holes being covered by capping material forming the capping layer in the first region, and the capping layer being opened at the second region corresponding to the roof layer and wherein the first region and the second region extend in parallel to one another.

The first region and the second region may extend in a linear manner.

The first region may overlap positions of the respective liquid crystal injection holes The capping layer may be patterned to have a plurality of spaced apart capping regions separated from each other by interposed ones of the second regions.

The capping material forming the first region of the capping layer may include an organic material or an inorganic material.

The capping material may include polyimide or polyacrylate.

The liquid crystal display may further include a lower insulating layer disposed between the microcavity and the roof layer, and a common electrode disposed between the micro-cavity and the lower insulating layer.

A liquid crystal injection holes forming region may be disposed between the microcavities, and a first region of the patterned capping layer covers the liquid crystal injection hole forming region.

The liquid crystal injection hole forming region may be extended in a direction that is parallel to a gate line connected to the thin film transistor.

The liquid crystal display may further include an overcoat layer disposed on the capping layer, wherein the overcoat layer covers a boundary of the first region and the second region.

The present disclosure of invention also provides a method for manufacturing a liquid crystal display, including: forming a thin film transistor on a substrate; forming a pixel electrode to be connected to a terminal of the thin film transistor; forming a sacrificial layer on the pixel electrode; forming a lower insulating layer on the sacrificial layer; forming a roof layer on the lower insulating layer; forming a plurality of micro-cavities having a corresponding one or more liquid crystal injection holes by removing the sacrificial layer; injecting a liquid crystal material into the micro-cavities; forming a donor substrate including a support layer, a light-to-heat conversion layer disposed below the support layer, and a transfer layer disposed below the light-to-heat conversion layer; selectively disposing the donor substrate on the roof layer so as to thereby allow part of the transfer layer to cover the liquid crystal injection holes for example by using a laser-induced thermal imaging (LITI) method, and thus forming the patterned capping layer.

The patterned capping layer may be formed to include a first region and a second region, the liquid crystal injection holes being covered by capping material forming the capping layer in the first region, and the capping layer being opened at the second region corresponding to the roof layer.

The first region and the second region may be formed to be extended in a parallel manner.

The first region and the second region may be formed to be extended in a linear manner.

The first region may be formed to overlap an edge of the microcavity.

The patterned capping layer may be formed to include a plurality of spaced apart capping regions separated from each other with corresponding second regions therebetween.

The method further includes forming a common electrode between the sacrificial layer and the lower insulating layer.

A liquid crystal injection hole forming region is disposed between the micro-cavities, and a first region of the capping layer is formed to cover the liquid crystal injection hole forming region.

The liquid crystal injection hole forming region is formed to be extended in a direction that is parallel to a gate line connected to the thin film transistor.

The method further includes forming an overcoat layer on the capping layer, wherein the overcoat layer is formed to cover a boundary of the first region and the second region.

According to the exemplary embodiments of the present disclosure of invention, a degree of exposure of the injected liquid crystal material with a fluidic form of the capping material is reduced by using the laser-induced thermal imaging (LITI) method to thereby rapidly form the capping layer that covers the liquid crystal injection holes through the laser-induced thermal imaging (LITI) method, thereby minimizing danger of contamination of the liquid crystal by a fluidic form of the capping material. Additionally, the capping layer is made more flexible by virtue of it being patterned to have the thinned second regions.

DETAILED DESCRIPTION

Figure 1:
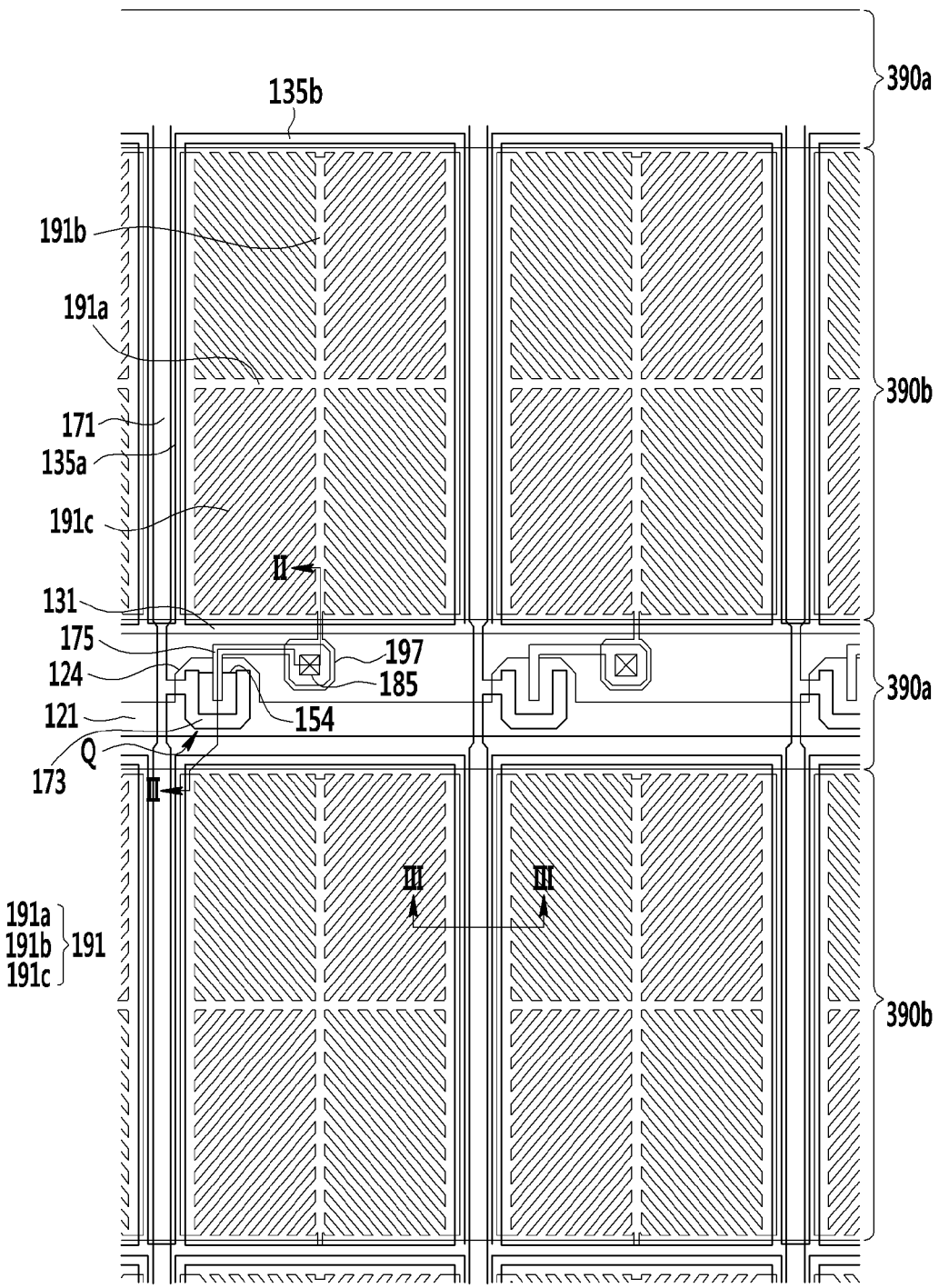
FIG. 1 shows a top plan view of a liquid crystal display according to an exemplary embodiment of the present disclosure.

Exemplary embodiments in accordance with the present disclosure of invention will now be described in more detail with reference to the accompanying drawings. However, the present disclosure is not limited to the exemplary embodiments used herein and may be implemented in other forms. In addition, exemplary embodiments introduced herein are disposed to make disclosed contents thorough and complete, and to sufficiently transfer the spirit of the present teachings to those skilled in the art.

In the drawings, the thickness of layers, films, panels, regions, etc., are exaggerated for clarity. It will be understood that when a layer is referred to as being "on" another layer or substrate, it can be directly on the other layer or substrate, or intervening them may also be present. Like reference numerals designate like elements throughout the specification.

Figure 2:
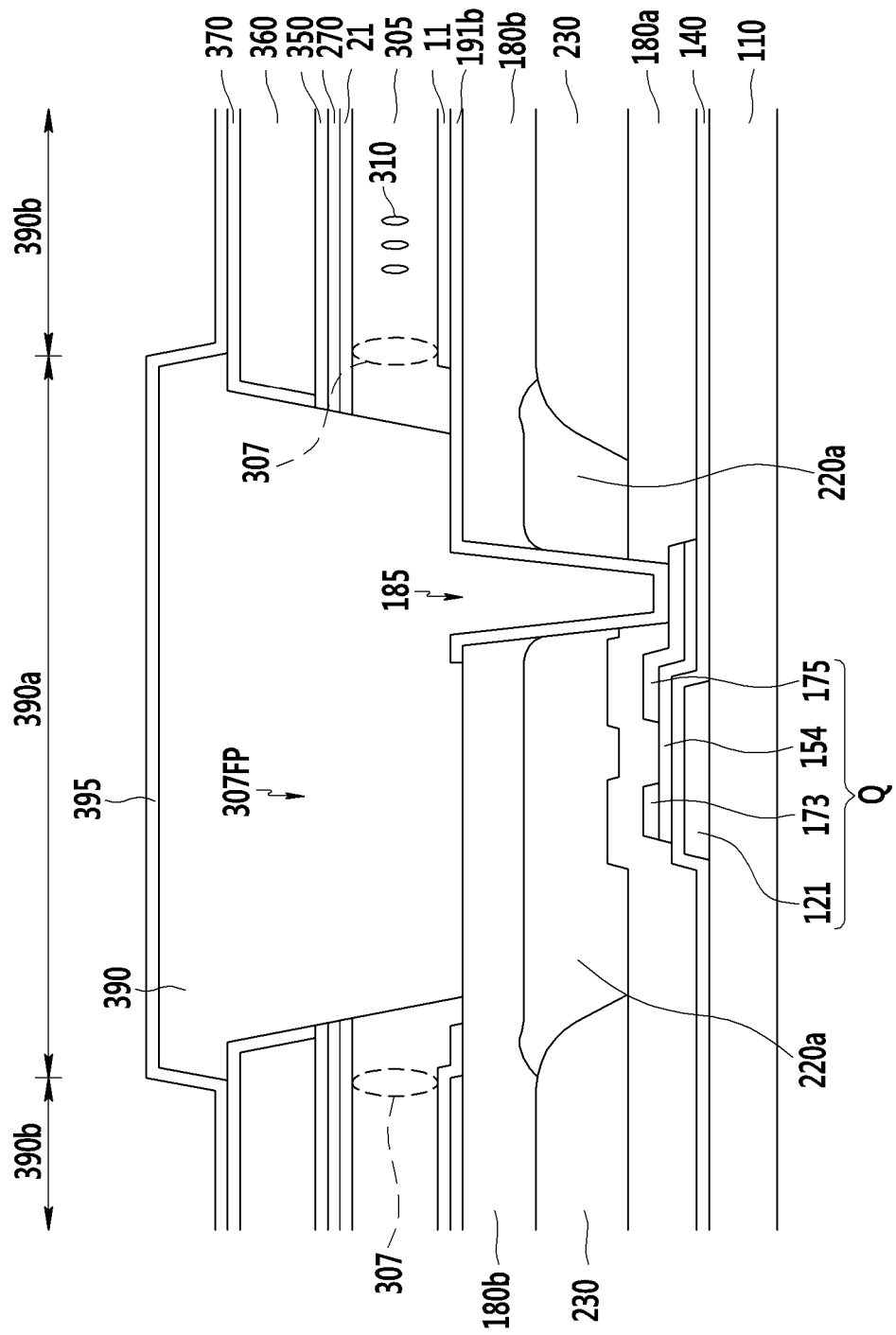
FIG. 2 shows a cross-sectional view with respect to a line II-II of FIG. 1.
Figure 3:
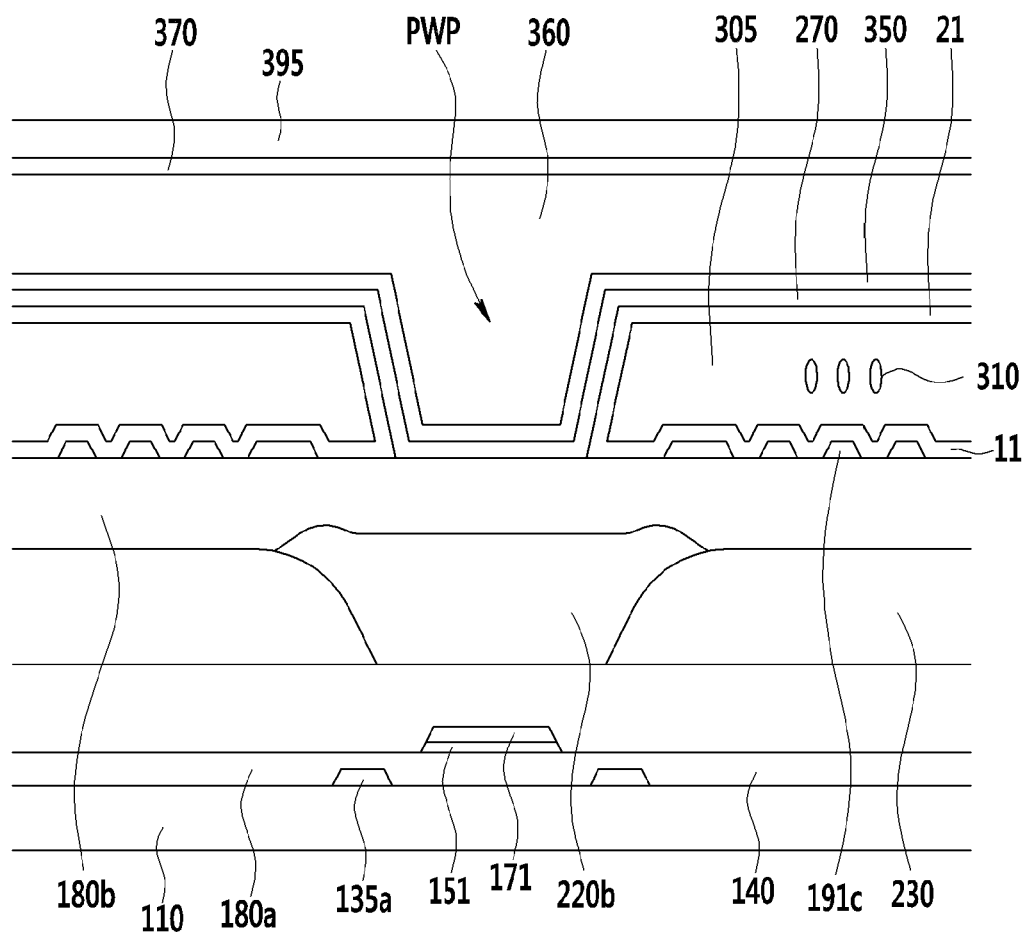
FIG. 3 shows a cross-sectional view with respect to a line III-III of FIG. 1.

FIG. 1 shows a top plan view of a liquid crystal display according to an exemplary embodiment. FIG. 2 shows a cross-sectional view with respect to a line of FIG. 1. FIG. 3 shows a cross-sectional view with respect to a line of FIG. 1.

Referring to FIG. 1 to FIG. 3, a gate line 121 and a storage electrode line 131 are formed on an insulating substrate 110 formed of a light-passing material such as a transparent glass or a plastic. The gate line 121 includes a gate electrode 124 branching therefrom. The storage electrode line 131 is mainly extended in a horizontal direction of the drawing, and transfers a predetermined voltage such as a common voltage (Vcom). The storage electrode line 131 includes a pair of vertical portions 135a substantially extended to be perpendicular to the gate line 121a, and a horizontal portion 135b connecting ends of the pair of vertical portions 135a to each other. The storage electrodes 135a and 135b wrap about a transparent pixel electrode 191.

A gate insulating layer 140 is formed on the gate line 121 and on the storage electrode line 131

A first semiconductive layer portion 151 is positioned at a lower portion of a data line 171, and a second semiconductive layer portion 154 is positioned at a lower portion of opposed source/drain electrodes having a channel portion defined therebetween such that a thin film transistor (Q) is formed on the gate insulating layer 140.

A plurality of ohmic contacts may be formed on each of the semiconductor layers 151 and 154, and between the data line 171 and the respective source/drain electrode, but they are omitted in the drawings to avoid illustrative clutter.

Data conductors 171, 173, and 175 including a source electrode 173, the data line 171 connected with the source electrode 173, and a drain electrode 175 are formed on each of the semiconductive layer portions 151 and 154 and on the gate insulating layer 140.

The gate electrode 124, the source electrode 173, and the drain electrode 175 form parts of the thin film transistor (Q) together with the semiconductive layer portion 154, where the channel of the thin film transistor Q is formed on the semiconductive layer portion 154 between the source electrode 173 and the drain electrode 175.

A first interlayer insulating layer 180a is formed on the data conductors 171, 173, and 175, and an exposed portion of the semiconductive layer portion 154. The first interlayer insulating layer 180a may include an inorganic insulating material, such as a silicon nitride (SiNx) and a silicon oxide (SiOx), or an organic insulating material.

A color filter 230 and a light blocking member (220a and 220b) are formed on the first interlayer insulating layer 180a.

In one embodiment, the light blocking member (220a and 220b) has a lattice or matrix structure having respective openings corresponding to light controlling regions (aperture regions) used for displaying a desired image. The light blocking member (e.g., black matrix) may be formed of an opaque and/or reflective material suitable for preventing light from being transmitted therethrough. The color filter 230 is formed within the opening of the light blocking member (220a and 220b). The light blocking member (220a and 220b) includes a horizontal light blocking member portion 220a formed to extend in a direction parallel to the gate line 121 and a vertical light blocking member portion 220b formed to extend in a direction parallel to the data line 171.

The color filter 230 may display one of primary colors, such as the three primary colors red, green, and blue. However, the colors are not limited to red, green, and blue, and the color filter 230 may also display one among a cyan-based color, a magenta-based color, a yellow-based color, and a white-based or clear color. The color filter 230 may be formed of a material displaying different colors for each adjacent pixel.

A second interlayer insulating layer 180b covering the color filter 230 and the light blocking member 220 is formed on the color filter 230 and the light blocking member 220. The second interlayer insulating layer 180b may include an inorganic insulating material, such as a silicon nitride (SiNx) and a silicon oxide (SiOx), or an organic insulating material. Contrary to the illustration in the cross-sectional view of FIG. 2, in a case where a surface step is generated due to a difference in thickness between the color filter 230 and the light blocking member 220, the second interlayer insulating layer 180b includes a planarized organic insulating material, so that it is possible to decrease or remove the step.

A contact hole 185 through which the drain electrode 175 is exposed is formed in the color filter 230, the light blocking member 220, and the interlayer insulating layers 180a and 180b.

The pixel electrode 191 is positioned on the second interlayer insulating layer 180b. The pixel electrode 191 may be formed of a transparent conductive material such as ITO or IZO.

An entire general shape of the pixel electrode 191 may be a quadrangle as illustrated, and may include in its details a cross-shaped stem portion including a horizontal stem portion 191a and a vertical stem portion 191b crossing the horizontal stem portion 191a. Further, the pixel electrode 191 is divided into four sub-regions by the horizontal stem portion 191a and the vertical stem portion 191b, and each sub-region includes a plurality of micro-branch portions 191c. Also, the pixel electrode 191 may further include an outer stem portion surrounding an outer side of the pixel electrode 191.

The micro-branch portion 191c of the pixel electrode 191 forms an angle of approximately 40 degrees to 45 degrees with respect to the gate line 121 or the horizontal stem portion 191a. The micro-branch portions of the adjacent two sub regions may be orthogonal to each other. A width of the micro-branch portion is gradually increased, or intervals between the micro-branch portions 191c may be different from each other.

The pixel electrode 191 includes an extended portion 197 connected at a lower end of the vertical stem portion 191b and having a wider area than that of the vertical stem portion 191b, is physically and electrically connected with the drain electrode 175 through the contact hole 185 at the extended portion 197, and receives a data voltage from the drain electrode 175.

The description of the aforementioned thin film transistor Q and pixel electrode 191 is one example, and a structure of the thin film transistor and a design of the pixel electrode may be modified in order to achieve various design goals such as to differently improve side visibility.

A lower alignment layer 11 is formed on the pixel electrode 191, and the lower alignment layer 11 may be a vertical alignment layer. The lower alignment layer 11 can be formed inclusive of at least one of generally-used materials such as polyamic acid, polysiloxane, or polyimide used for the a liquid crystal alignment layer.

An upper alignment layer 21 is positioned at a portion facing the lower alignment layer 11, and a microcavity 305 is formed between the lower alignment layer 11 and the upper alignment layer 21. A liquid crystal material including liquid crystal molecules 310 is injected in the microcavity 305 through a mouth of the microcavity which is referred to here as the liquid crystal injection hole 307. The microcavity 305 may be formed along a column direction, that is, a vertical direction, of the pixel electrode 191. An alignment material forming the alignment layers 11 and 21 and the liquid crystal material including the liquid crystal molecules 310 may be injected into the microcavity 305 by using capillary force.

The microcavities 305 are distributed along a horizontal direction and along sidewalls of a trough like region referred to here as the liquid crystal injection holes forming region 307FP which is positioned at a portion overlapping the gate line 121, and may be plural along the direction in which the gate line 121 is extended. Each of the plurality of formed microcavities 305 may correspond to a respective pixel area, and the pixel area may correspond to an aperture region controlling light passing therethrough for accordingly displaying a desired image.

A common electrode 270 and a lower insulating layer 350 are positioned on the upper alignment layer 21. The common electrode 270 receives the common voltage (Vcom), and generates an electric field together with the pixel electrode 191 to which the data voltage is applied to determine a direction in which the liquid crystal molecules 310 positioned within the microcavity 305 between the two electrodes are inclined. The common electrode 270 forms a capacitor with the pixel electrode 191 to maintain the received voltage even after the thin film transistor is turned off. The lower insulating layer 350 may be formed of a silicon nitride (SiNx) or a silicon oxide (SiOx).

In the present exemplary embodiment, it is described that the common electrode 270 is monolithically integrated formed on top of the microcavity 305. But in another exemplary embodiment, the common electrode 270 may be formed at a lower portion of the microcavity 305, so that liquid crystal driving according to a horizontal electric field mode is possible.

A roof layer 360 is positioned on the lower insulating layer 350. The roof layer 360 serves to make a support so that the microcavity 305, which is a space between the pixel electrode 191 and the common electrode 270, is formed. The roof layer 360 may include a photoresist or other organic materials.

An upper insulating layer 370 is positioned on the roof layer 360. The upper insulating layer 370 may be in contact with an upper surface of the roof layer 360. The upper insulating layer 370 may be formed of a silicon nitride (SiNx) or a silicon oxide (SiOx).

The capping layer 390 may be disposed in the liquid crystal injection holes forming region 307FP and may cover the corresponding liquid crystal injection holes 307 of the respective microcavities 305 that during manufacture exposed by the liquid crystal injection holes along the sidewalls of the trough-forming region 307FP. The capping layer 390 is patterned so as to be differentiated into a first region 390a of a raised nature and a second region 390b of a reduced or devoid nature (essentially devoid of the capping material). The first region 390a includes the liquid crystal injection hole forming region 307FP and overlaps an edge of the microcavity 305. In other words, the first region 390a represents a part for a capping material to cover and seal closed the liquid crystal injection holes 307. The second region 390b is not covered by the capping material (or has a substantially reduced amount of such material) and does not have corresponding liquid crystal injection holes 307. That is, the capping layer 390 is patterned so as not to be disposed in an entire region of an upper side of the upper insulating layer 370 but rather to have thinned or devoid portions which allow for flexibility.

The first region 390a of the capping layer 390 is disposed in a lengthy (elongated) manner in a direction in which the trough-like, liquid crystal injection hole forming region 307FP is extended at a part that corresponds to the interior sidewalls of the liquid crystal injection hole forming region 307FP. The first region 390a includes a plurality of capping regions that are spaced apart from each other by the interposition of second regions 390b therebetween. As shown in FIG. 1, the first region 390a and the second region 390b can be linearly extended in a direction in which the gate line 121 is extended in a parallel manner.

The capping layer 390 includes an organic material or an inorganic material. The capping layer 390 may include a polyimide or a polyacrylate.

An overcoat layer 395 formed with an inorganic layer or an organic layer can be disposed on the capping layer 390. The overcoat layer 395 protects the liquid crystal molecules 310 injected into the microcavity 305 from external impacts and flattens (provides improved planarity to) the layer. The overcoat layer 395 can be an organic material or an inorganic material. The organic material can be polymethylmethacrylate (PMMA), polystyrene (PS), polymer derivatives having phenol groups, acryl polymers, imide polymers, aryl ether polymers, amide polymers, fluorine polymers, p-xylene polymers, vinyl alcohol polymers, and a material that is a combination thereof. When the overcoat layer 395 is an inorganic material, it can be a material made of a silicon oxide (SiOx), a silicon nitride (SiNx), aluminum oxide (Al2O3), titanium oxide (TiO2), tantalum oxide (Ta2O5), hafnium oxide (HfO2), zirconium oxide (ZrO2), or a combination thereof.

As shown in FIG. 3, a partition wall portion (PWP) is formed between the sets of microcavities 305 neighboring one another in the horizontal direction. The partition wall portion (PWP) can be formed in a direction in which the data line 171 is extended, and it can be covered by the roof layer 360. The lower insulating layer 350, the common electrode 270, and the roof layer 360 are disposed in the partition wall portion (PWP), which forms a partition wall, and thus partitions or defines the separation between respective sets of the microcavities 305. There is provided a partition wall structure such as the partition wall portion (PWP) between the sets of the microcavities 305 so when the insulation substrate 110 is bent, less stress is generated and a change of a cell gap is much reduced.

A polarizer (not shown) is disposed at a bottom of the insulation substrate 110 and a top of the upper insulating layer 370. The polarizer can include a polarization element for generating polarization and a tri-acetyl-cellulose (TAG) layer for acquiring durability, and depending on the exemplary embodiment, directions of transmissive axes of an upper polarizer and a lower polarizer can be perpendicular or parallel.

Referring to FIG. 4 to FIG. 16, a method for manufacturing the above-described liquid crystal display according to an exemplary embodiment will now be described. The exemplary embodiment to be described below is an exemplary embodiment of a manufacturing method and is changeable into other forms consistent with the present teachings.

FIG. 4 to FIG. 16 show cross-sectional views of a method for manufacturing a liquid crystal display according to an exemplary embodiment in accordance with the present teachings. FIGS. 4, 6, 8, 10, 11, 13, 15, and 16 sequentially show cross-sectional views with respect to a line II-II of FIG. 1. FIGS. 5, 7, 9, 12, and 14 show cross-sectional views with respect to a line III-III of FIG. 1.

Figure 4:
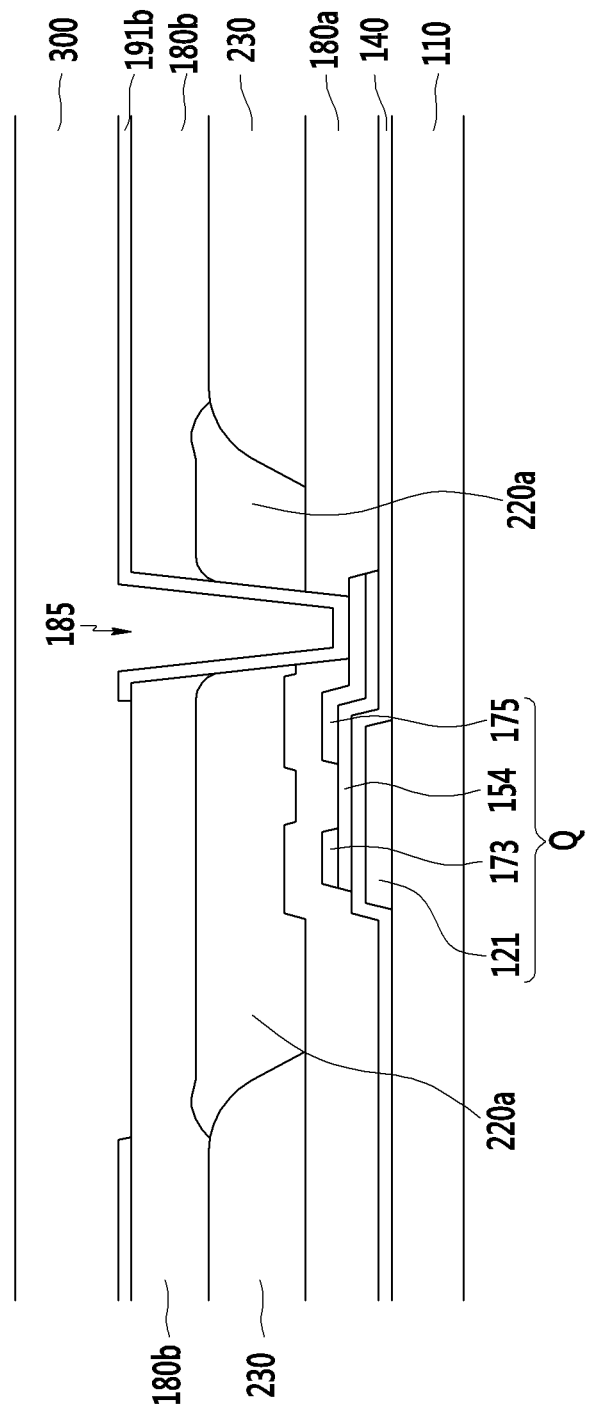
FIG. 4 to FIG. 16 show cross-sectional views of a method for manufacturing a liquid crystal display according to an exemplary embodiment in accordance with the present disclosure of invention.
Figure 5:
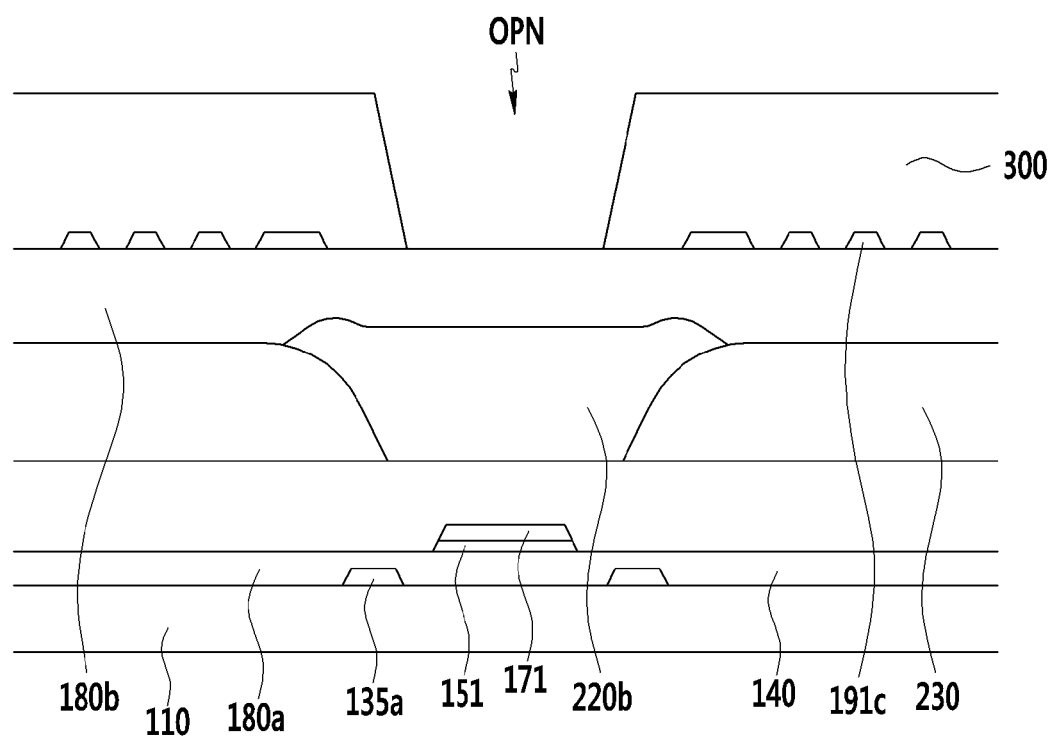

Referring to FIG. 1, FIG. 4, and FIG. 5, to form a general switching element on the substrate 110, a gate line 121 extended in the horizontal direction is formed on the substrate, a gate insulating layer 140 is formed on the gate line 121, semiconductive layer portions 151 and 154 are formed on the gate insulating layer 140, and a source electrode 173 and a drain electrode 175 are formed. In this instance, a data line 171 connected to the source electrode 173 can be formed to cross the gate line 121 and be extended in the vertical direction.

A first interlayer insulating layer 180a is formed on the data conductors 171, 173, and 175 including the source electrode 173, the drain electrode 175, and the data line 171 and the exposed semiconductive layer portion 154.

A color filter 230 is formed at a position that corresponds to a pixel area on the first interlayer insulating layer 180a, and a light blocking member 220 is formed in boundary areas of the color filter 230.

A second interlayer insulating layer 180b is formed on the color filter 230 and the light blocking member 220 to cover them, and the second interlayer insulating layer 180b is formed to have a contact hole 185 extending therethrough for electrically and physically connecting the pixel electrode 191 and the drain electrode 175.

A pixel electrode 191 is formed on the second interlayer insulating layer 180b, and a sacrificial layer 300 is formed on the pixel electrode 191. As shown in FIG. 5, an opening (OPN) is formed in the sacrificial layer 300 in a direction that is parallel to the data line 171. The opening (OPN) is filled with the common electrode 270, the lower insulating layer 350, the roof layer 360 material, and the upper insulating layer 370 to thereby form a partition wall portion (PWP) as shown in FIG. 7.

Figure 6:
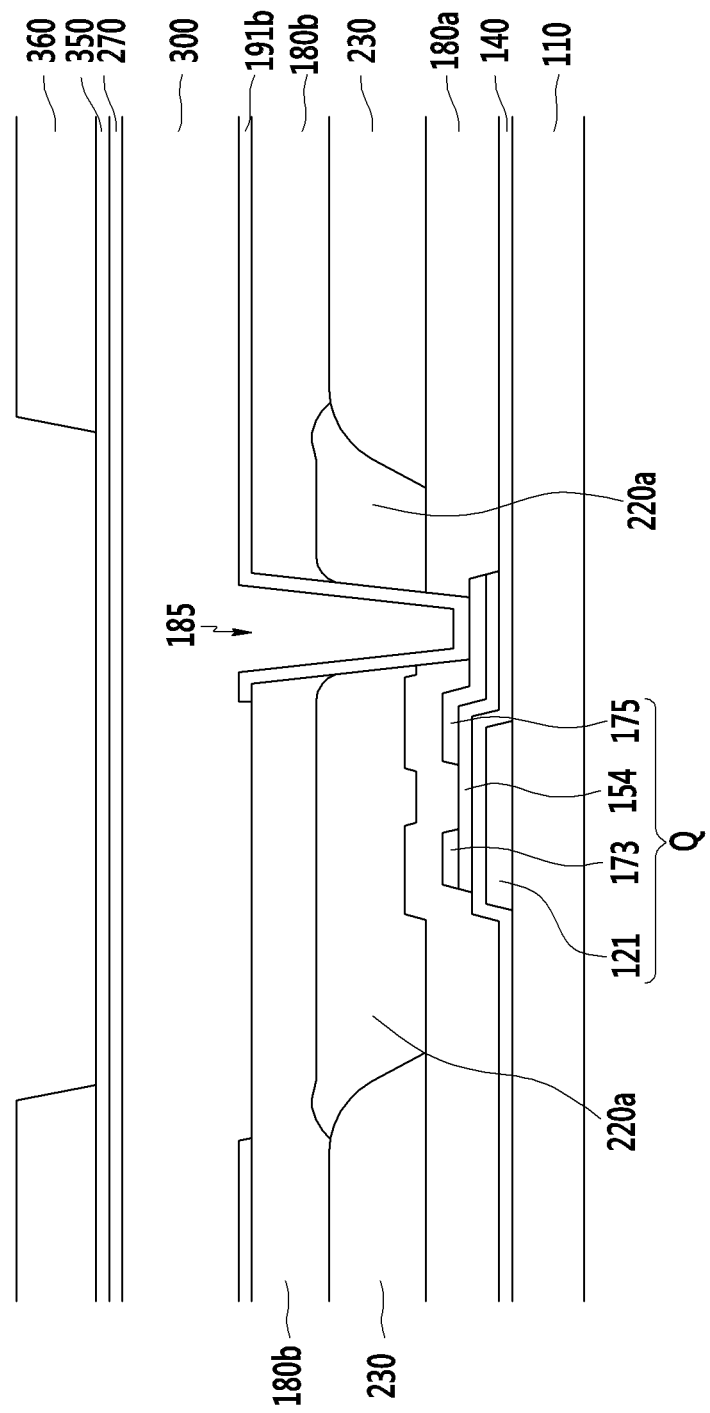
Figure 7:
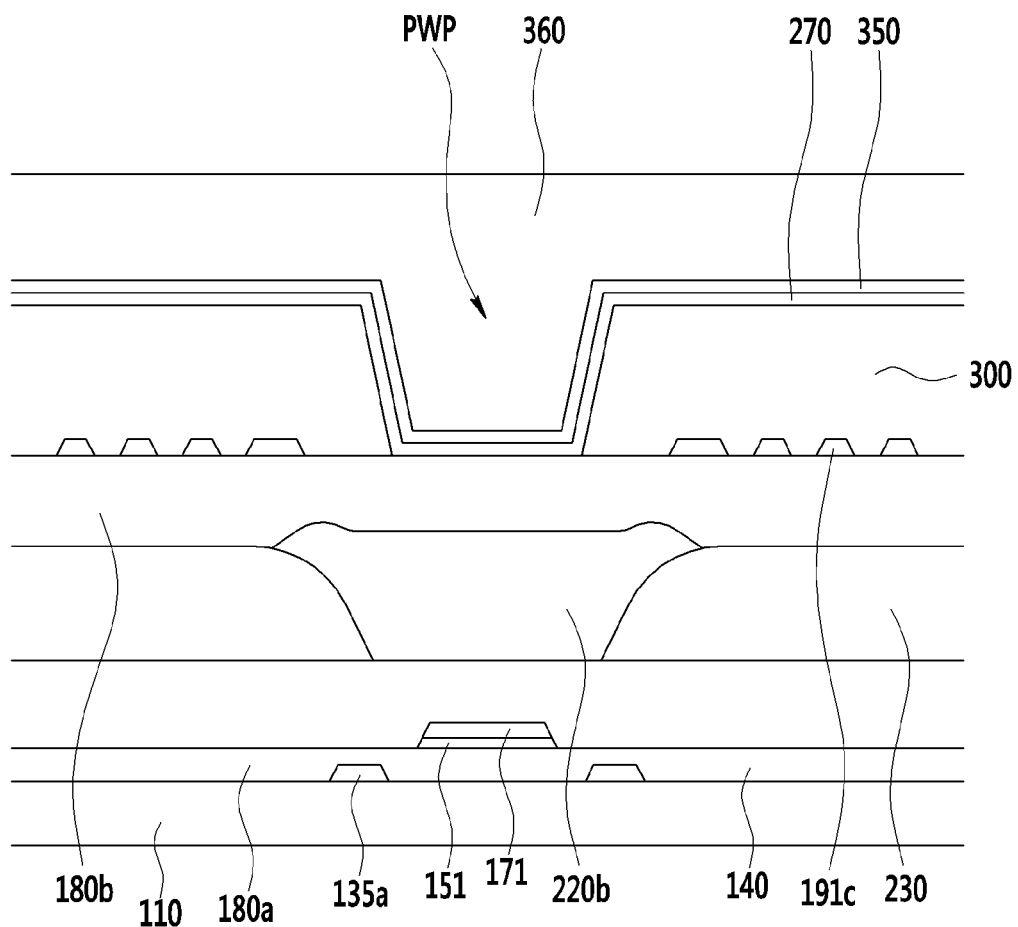

Referring to FIG. 6 and FIG. 7, a common electrode 270, a lower insulating layer 350, and a roof layer 360 are sequentially formed on the sacrificial layer 300. The roof layer 360 can be eliminated from a region that corresponds to the light blocking member 220 disposed between the pixel areas neighboring in the vertical direction by an exposure and development process. The roof layer 360 exposes the lower insulating layer 350 at the region that corresponds to the light blocking member 220. In this instance, the common electrode 270, the lower insulating layer 350, and the roof layer 360 fill the opening (OPN) of the vertical light blocking member 220b and form the partition wall portion (PWP).

Figure 8:
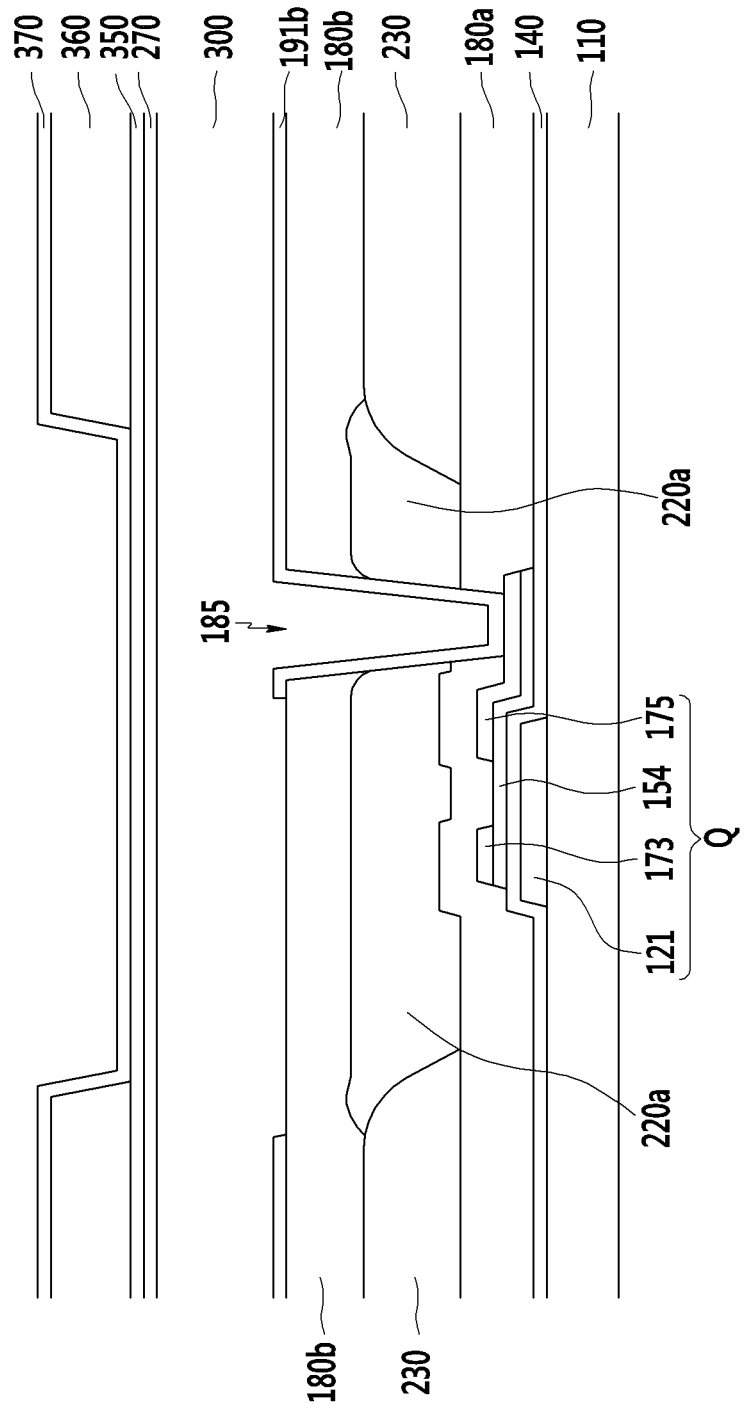
Figure 9:
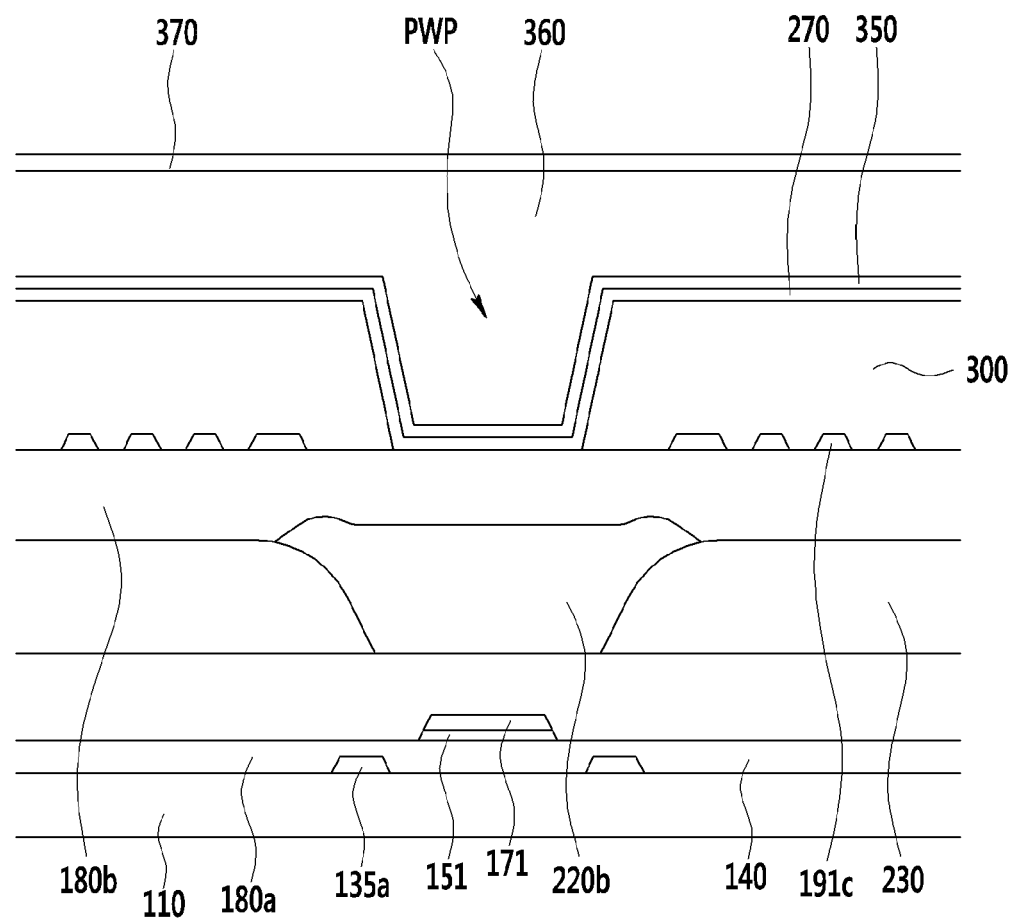

Referring to FIG. 8 and FIG. 9, an upper insulating layer 370 is formed to cover the roof layer 360 and the exposed lower insulating layer 350.

Figure 10:
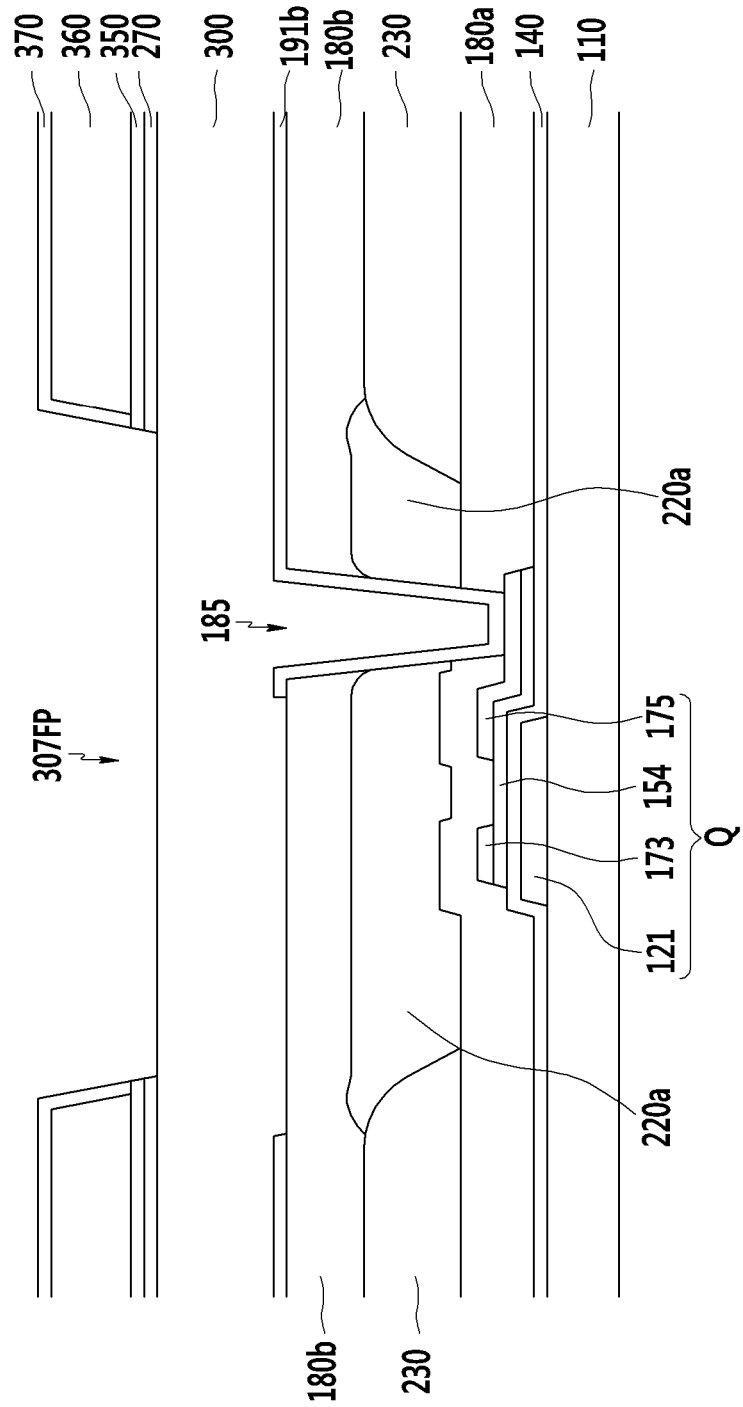

Referring to FIG. 10, the upper insulating layer 370, the lower insulating layer 350, and the common electrode 270 are dry-etched to partially remove the upper insulating layer 370, the lower insulating layer 350, and the common electrode 270 and thereby form a liquid crystal injection holes forming region 307FP. In this instance, the upper insulating layer 370 may have a structure for covering a side of the roof layer 360, and without being restricted to this, it is also possible to have the side of the roof layer 360 exposed to the outside by removing the upper insulating layer 370 covering the side of the roof layer 360.

Figure 11:
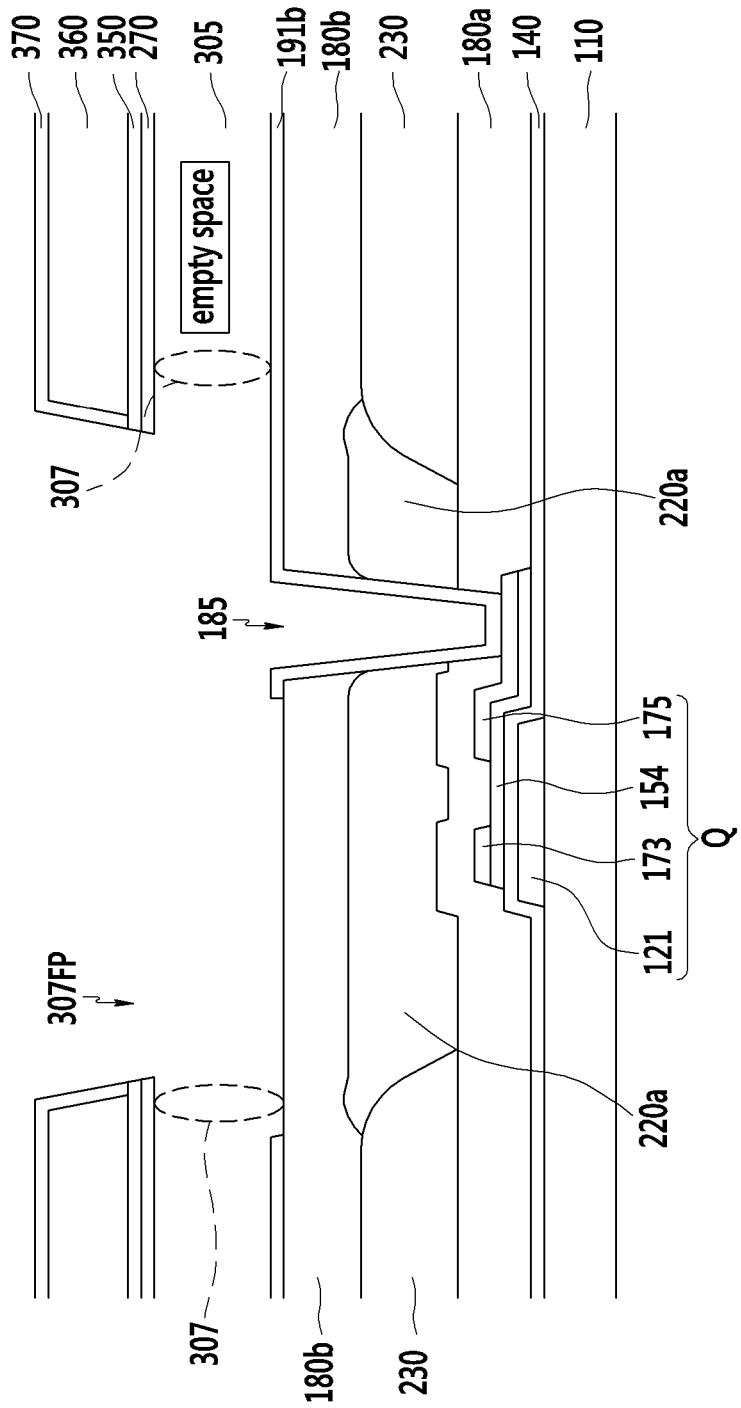
Figure 12:
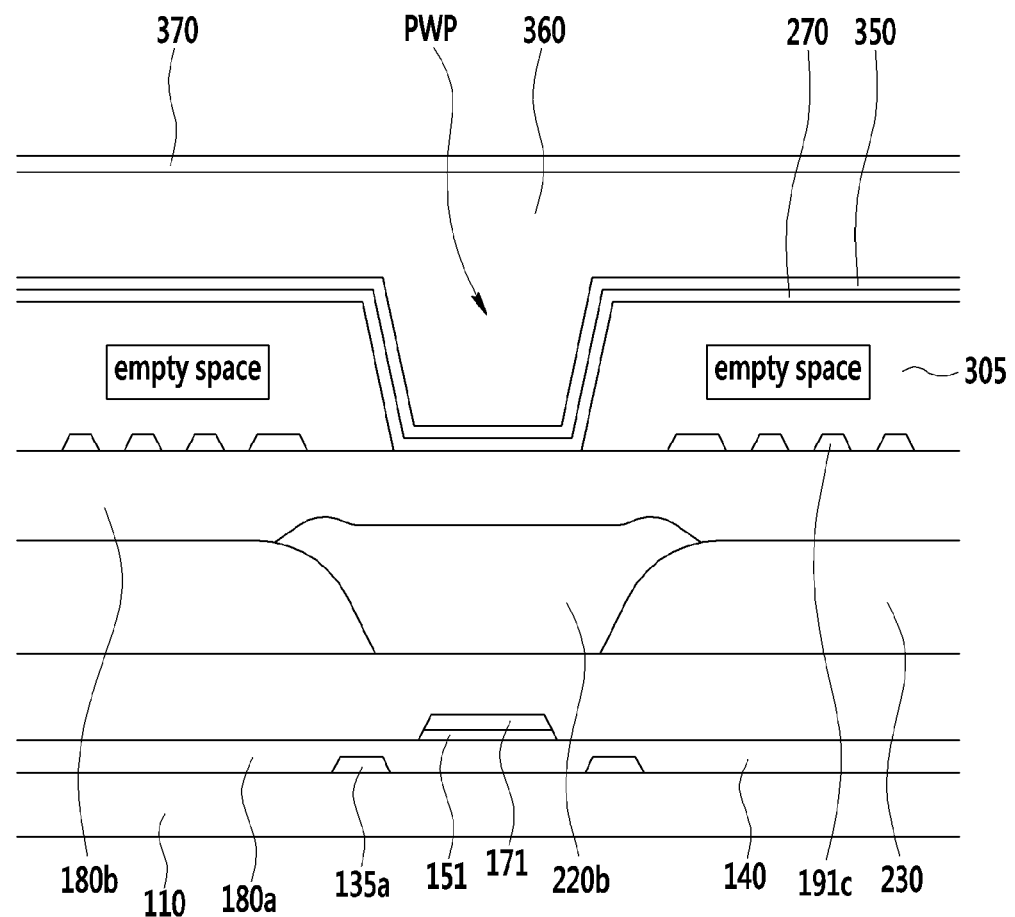

Referring to FIG. 11 and FIG. 12, the sacrificial layer 300 is selectively removed where exposed through the liquid crystal injection holes forming region 307FP by for example performing an oxygen ($O_2$) ashing process or a wet etching process. In this instance, a corresponding microcavity 305 having a liquid crystal injection hole 307 is formed. The microcavity 305 is an empty space from which the sacrificial layer 300 has been eliminated.

Figure 13:
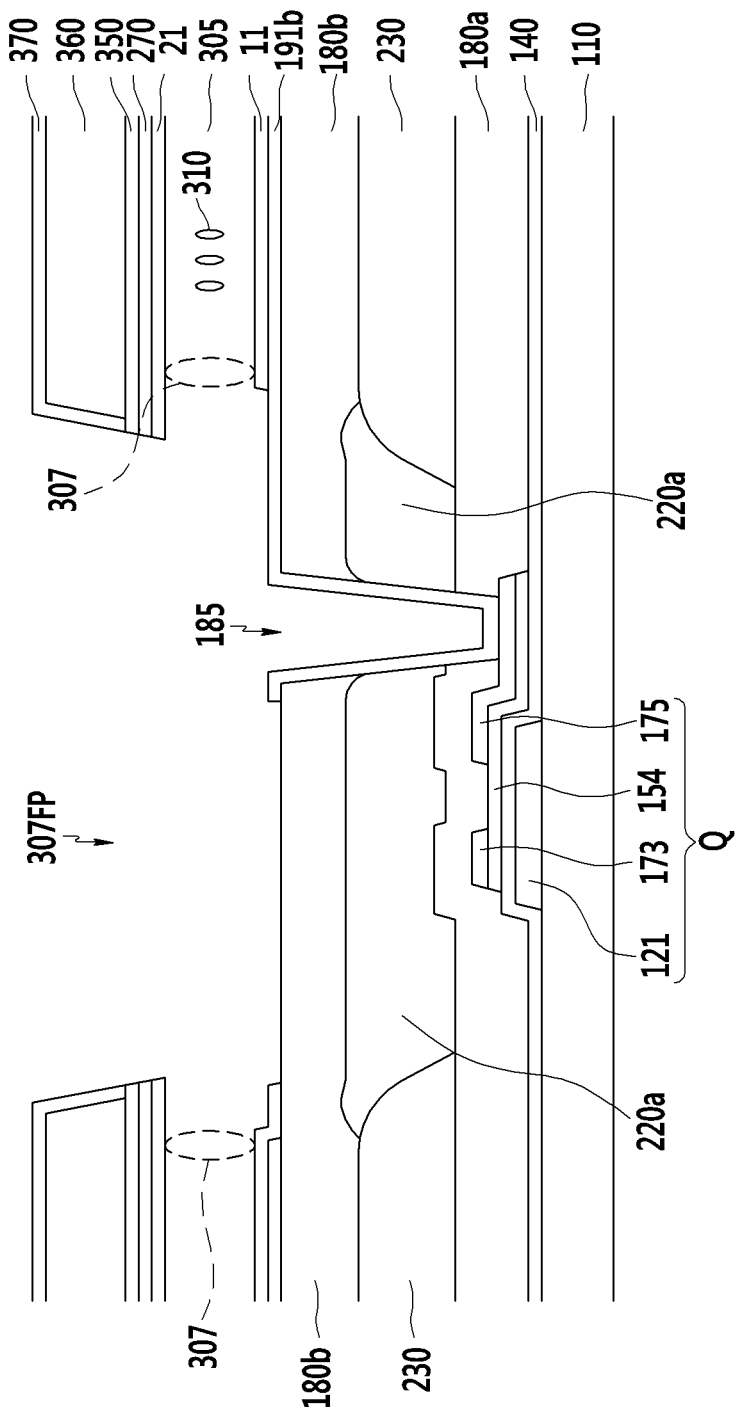
Figure 14:
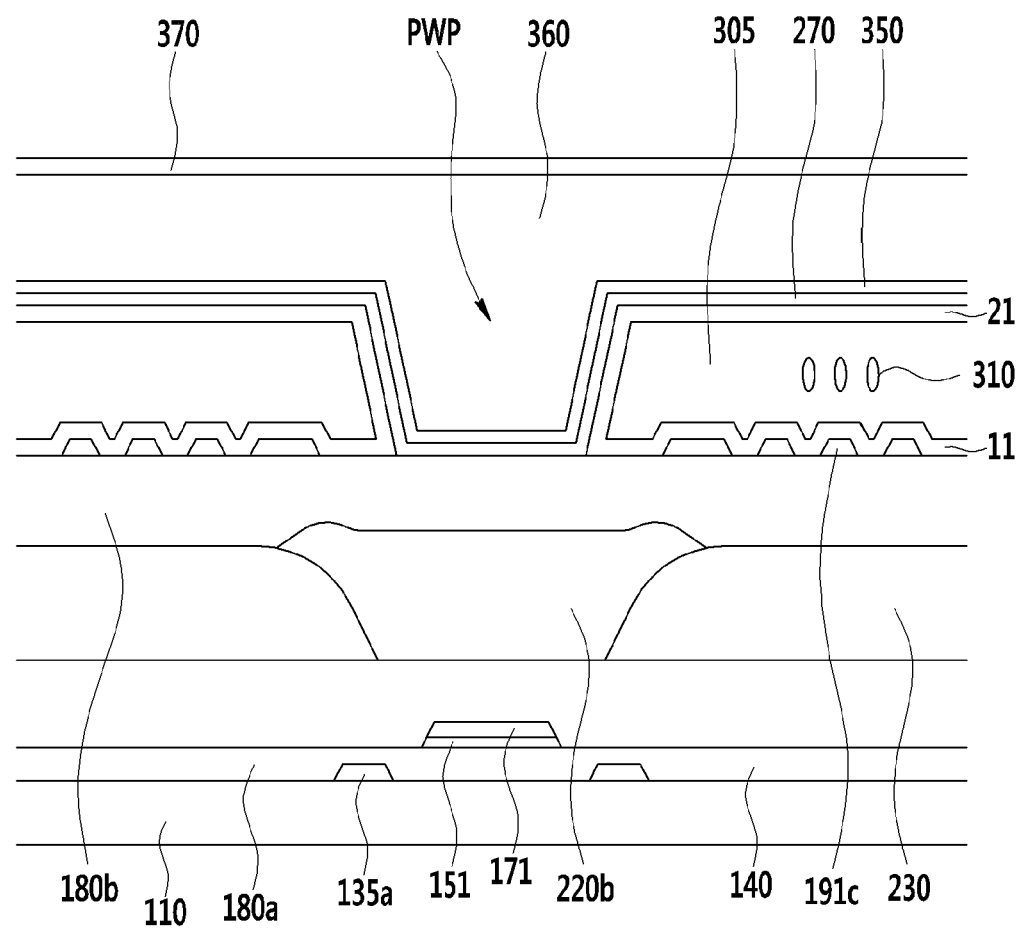

Referring to FIG. 13 and FIG. 14, an alignment material is injected (e.g., absorbed by surface capillary action) through the liquid crystal injection hole 307 to form alignment layers 11 and 21 on the pixel electrode 191 and the common electrode 270. In detail, the alignment material including a solid content and a solvent is injected through the liquid crystal injection hole 307 and a bake process is then performed to selectively remove the solvent while leaving the solidified alignment material adhered to the interior surfaces of the microcavity 305.

A liquid crystal material including liquid crystal molecules 310 is next injected into the microcavity 305 through the liquid crystal injection hole 307 for example by using an inkjet method.

Figure 15:
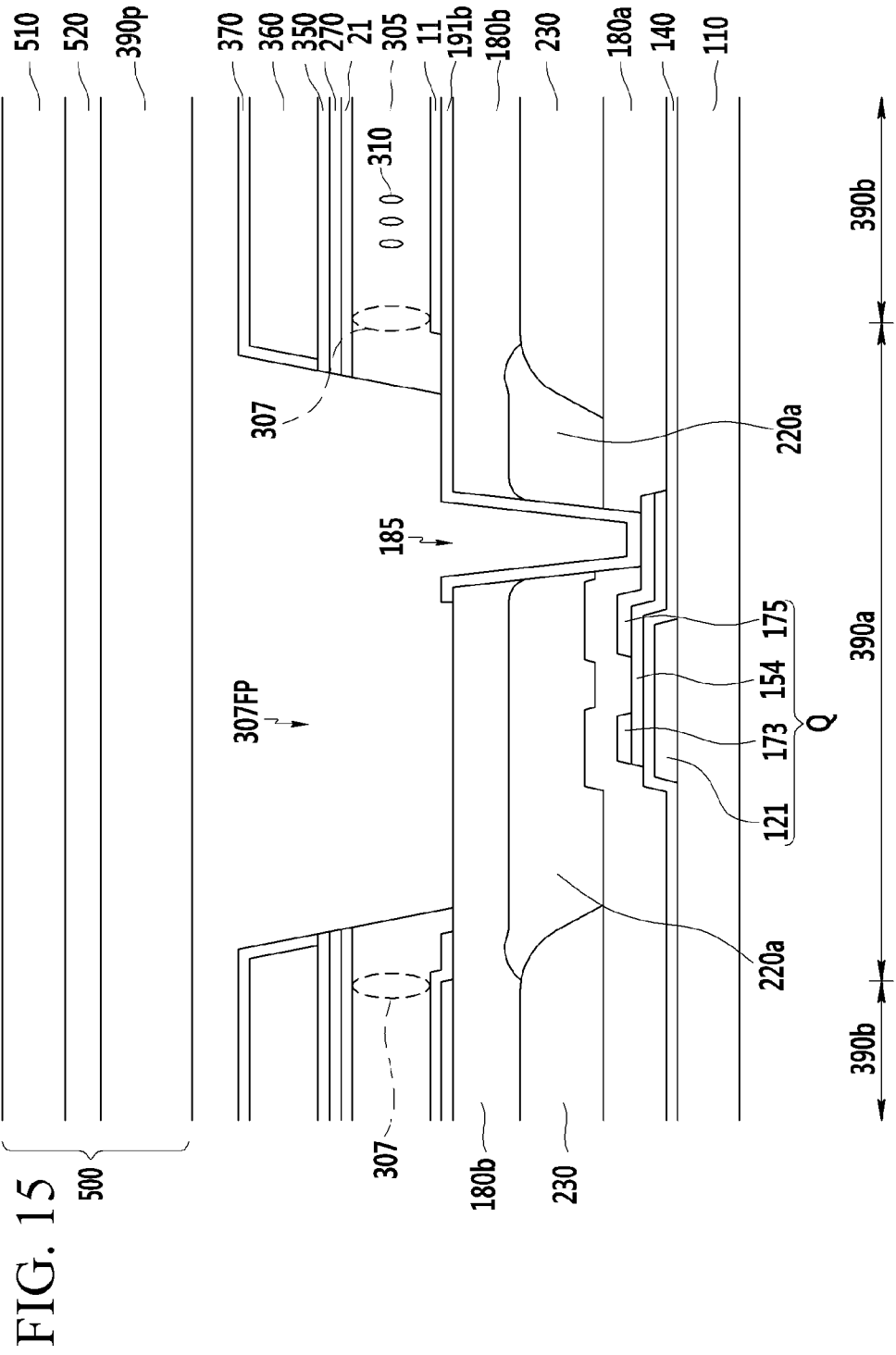

Referring to FIG. 15, a donor substrate 500 including a support layer 510, a light-to-heat conversion layer 520 disposed below the support layer 510, and a transfer layer 390*p* below the light-to-heat conversion layer 520 are disposed as shown relative to the in-process substrate.

The support layer 510 may include a material with high optical transmittance such as a transparent polymer material, for example, glass, polyethylene terephthalate (PET), polyethylene naphthalate (PEN), polyethylene (PE), or polycarbonate (PC).

The light-to-heat conversion layer 520 converts incident light into heat, and it may include a metal material with a great absorption rate, for example, chromium (Cr), molybdenum (Mo), titanium (Ti), tungsten, aluminum oxide, aluminum sulfide, or an alloy thereof. Further, a light absorbing layer 120 may include carbon (C) or an infrared dye.

The transfer layer 390*p* becomes selectively separated from the support layer 510 by local development of thermal energy when locally subjected by the light-to-heat conversion layer 520 to such thermal energy, and is thus locally and selectively transferred to the substrate portion that is its transfer target. The transfer layer 390*p* can include a capping material.

As shown in FIG. 15, a donor substrate 500 is disposed to face the liquid crystal display according to the present exemplary embodiment. Patterned laser beams can be irradiated along the position that corresponds to a first region 390*a* of the capping layer by using a laser-induced thermal imaging (LITI) method. The patterned laser beams correspond to the part in which the liquid crystal injection hole forming region 307FP is formed. On the other hand, the laser beams are not irradiated to the portions corresponding to the so-called, second regions (e.g., devoid or substantially thinner regions) 390*b* of the capping layer.

Figure 16:
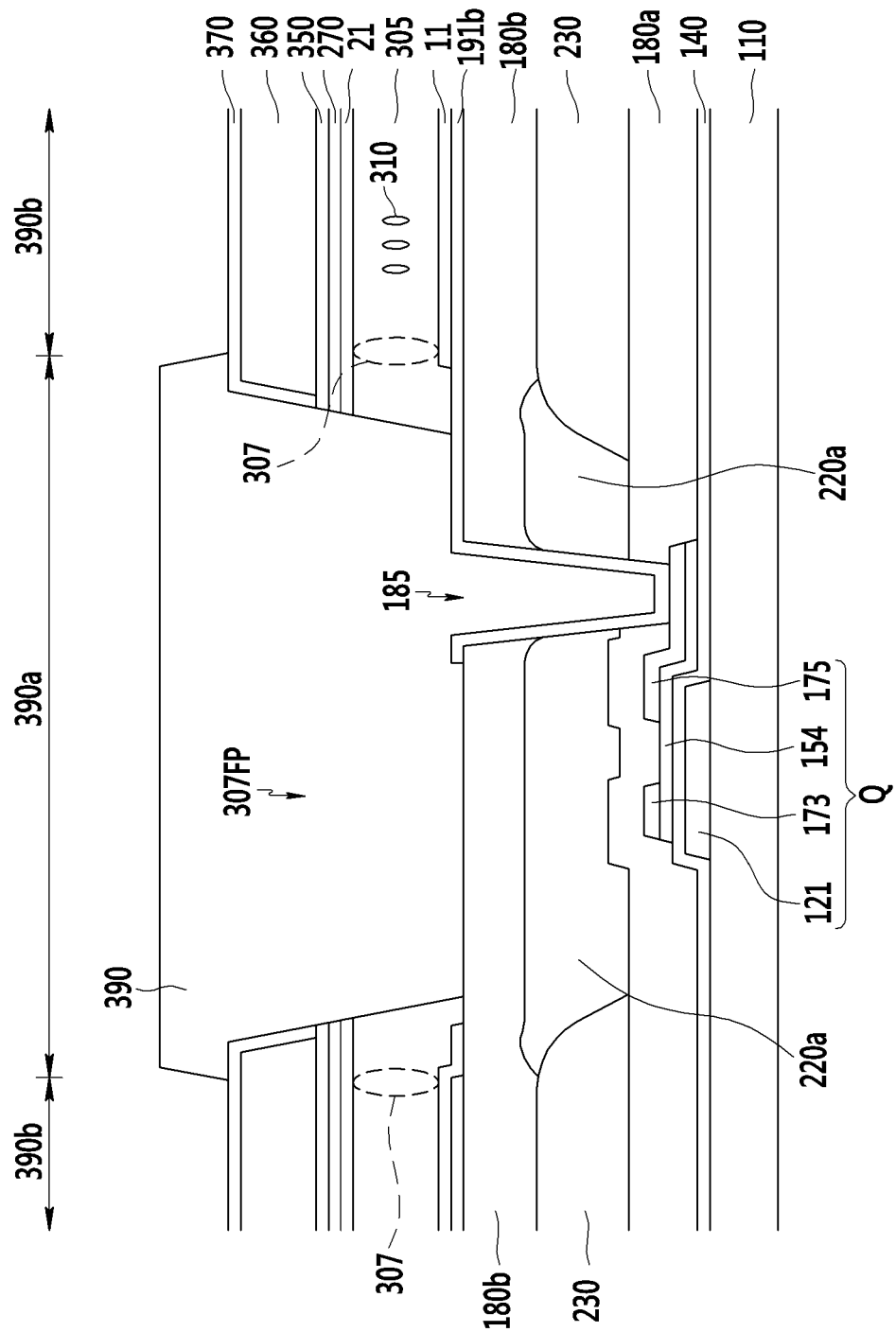

Referring to FIG. 16, the laser-induced thermal imaging (LITI) method is applied to cover the liquid crystal injection hole forming region 307FP and form the patterned capping layer 390. When laser energy is applied to the light-to-heat conversion layer 520 by the laser-induced thermal imaging (LITI) method, the light-to-heat conversion layer 520 is expanded, the transfer layer 390*p* is expanded, and the transfer layer 390*p* is separated from the support layer 510 of the donor substrate 500 so the transfer layer 390*p* is transferred to cover the liquid crystal injection hole 307 of the liquid crystal display and the liquid crystal injection hole forming region 307FP. The laser-induced thermal imaging (LITI) method rapidly forms the capping layer 390 comparing with a coating and a curing after the coating. Therefore, the LITI method may reduce a danger of contamination of the liquid crystal.

Here, a first region 390*a* of the capping layer 390 can be formed such that the transfer layer 390*p* may be transferred to overlap an edge of where the liquid crystal injection hole(s) 307 are present. Further, the reduced or zero thickness second regions 390*b* can be interposed between adjacent ones of the first regions 390*a* so as to subdivide the capping layer 390 into a plurality of relatively thick capping regions in the first regions 390*a* and substantially thinner or devoid second regions 390*b* so as to thereby provide for improved flexibility and/or stress relief.

While the present disclosure of invention has been described in connection with what is presently considered to be practical exemplary embodiments, it is to be understood that the present teachings are not limited to the disclosed embodiments, but, on the contrary, they are intended to cover various modifications and equivalent arrangements included within the spirit and scope of the present teachings.

What is claimed is:

1. A liquid crystal display comprising:
a substrate;
a thin film transistor disposed on the substrate;
a pixel electrode connected to a terminal of the thin film transistor;
a roof layer disposed to face the pixel electrode; and
a capping layer disposed on the roof layer, wherein a plurality of microcavities each having a respective liquid crystal injection hole and each being formed between the pixel electrode and the roof layer, the microcavities including liquid crystal materials,
wherein the capping layer is patterned to include a first region and a second region, the liquid crystal injection holes being entirely covered by capping material forming the capping layer in the first region, and the capping layer being opened at the second region corresponding to the roof layer so that the second region is not covered by the capping material, and wherein the first region and the second region extend in parallel to one another.

2. The liquid crystal display of claim 1, wherein the first region and the second region each extends in a linear manner.

3. The liquid crystal display of claim 2, wherein the first region overlaps positions of the respective liquid crystal injection holes.

4. The liquid crystal display of claim 3, wherein the capping layer is patterned to have a plurality of spaced apart capping regions separated from each other by interposed ones of the second regions.

5. The liquid crystal display of claim 4, wherein the capping material forming the first region of the capping layer includes an organic material or an inorganic material.

6. The liquid crystal display of claim 5, wherein the capping material includes a polyimide or a polyacrylate.

7. The liquid crystal display of claim 4, further including a lower insulating layer disposed between the microcavity and the roof layer, and a common electrode disposed between the microcavity and the lower insulating layer.

8. The liquid crystal display of claim 7, wherein a liquid crystal injection hole forming region is disposed between the microcavities, and the first region of the capping layer covers the liquid crystal injection hole forming region.

9. The liquid crystal display of claim 8, wherein the liquid crystal injection hole forming region extends in a direction that is parallel to a gate line connected to the thin film transistor.

10. The liquid crystal display of claim 1, further including an overcoat layer disposed on the capping layer, wherein the overcoat layer covers a boundary of the first region and the second region.

11. A method for manufacturing a liquid crystal display, comprising:
forming a thin film transistor on a substrate;
forming a pixel electrode configured to be connected to a terminal of the thin film transistor;
forming a sacrificial layer on the pixel electrode;
forming a lower insulating layer on the sacrificial layer;
forming a roof layer on the lower insulating layer;

forming a plurality of micro-cavities having a corresponding one or more liquid crystal injection holes by removing the sacrificial layer;

injecting a liquid crystal material into the micro-cavities;

forming a donor substrate including a support layer, a light-to-heat conversion layer disposed below the support layer, and a transfer layer disposed below the light-to-heat conversion layer;

selectively disposing the donor substrate on the roof layer;

allowing a part of the transfer layer to cover the liquid crystal injection holes to thus form a patterned capping layer; and wherein the capping layer is patterned to include a first region and a second region, the liquid crystal injection holes being entirely covered by capping material forming the capping layer in the first region, and the capping layer being opened at the second region corresponding to the roof layer so that the second region is not covered by the capping layer, and wherein the first region and the second region extend in parallel to one another.

12. The method of claim 11, wherein the first region and the second region are formed to extend in a linear manner.

13. The method of claim 12, wherein the first region is formed to overlap an edge of the microcavity.

14. The method of claim 13, wherein the patterned capping layer is formed to include a plurality of spaced apart capping regions separated from each other with corresponding second regions therebetween.

15. The method of claim 14, further including forming a common electrode between the sacrificial layer and the lower insulating layer.

16. The method of claim 15, wherein a liquid crystal injection hole forming region is disposed between the microcavities, and a first region of the capping layer is formed to cover the liquid crystal injection hole forming region.

17. The method of claim 16, wherein the liquid crystal injection hole forming region is formed to extend in a direction that is parallel to a gate line connected to the thin film transistor.

18. The method of claim 14, further including forming an overcoat layer on the capping layer, wherein the overcoat layer is formed to cover a boundary of the first region and the second region.

* * * * *